United States Patent [19]

Rachid

[11] Patent Number: 5,519,998

[45] Date of Patent: May 28, 1996

[54] APPARATUS FOR INTRODUCING FEED WATER INTO A COMBINED-CYCLE POWER STATION

[75] Inventor: Nabil Rachid, Ladenburg, Germany

[73] Assignee: ABB Patent GmbH, Mannheim, Germany

[21] Appl. No.: 353,123

[22] Filed: Dec. 9, 1994

[30]     Foreign Application Priority Data

Dec. 9, 1993 [DE] Germany .......................... 43 42 003.6

[51] Int. Cl.$^6$ .................................................. F01K 13/00
[52] U.S. Cl. ........................... 60/670; 122/451 R; 60/676
[58] Field of Search ............................. 60/667, 670, 655, 60/676; 122/451, 451.2, 451 R

[56]             References Cited

U.S. PATENT DOCUMENTS 4,173,124   11/1979   Fujii et al. ............................. 60/667
4,576,007   3/1986   Arakawa et al. ......................... 60/667

FOREIGN PATENT DOCUMENTS 2013976   12/1971   Germany .
2207227   8/1972   Germany .
2740530   3/1979   Germany .

*Primary Examiner*—Leonard E. Heyman
*Attorney, Agent, or Firm*—Herbert L. Lerner; Laurence A. Greenberg

[57]             ABSTRACT

An apparatus for introducing feed water into a steam generator, preferably into a waste-heat boiler of a combined-cycle power station having at least one waste-heat boiler, includes at least one feed-water container and a high-pressure system and a low-pressure system to be fed from the at least one feed-water container. The high-pressure and low-pressure systems each have respective feed-water pump lines, pumps connected in the feed-water pump lines, and an electrical drive motor. Each of the drive motors drive one of the pumps for the low-pressure system and one of the pumps for the high-pressure system in common.

7 Claims, 1 Drawing Sheet

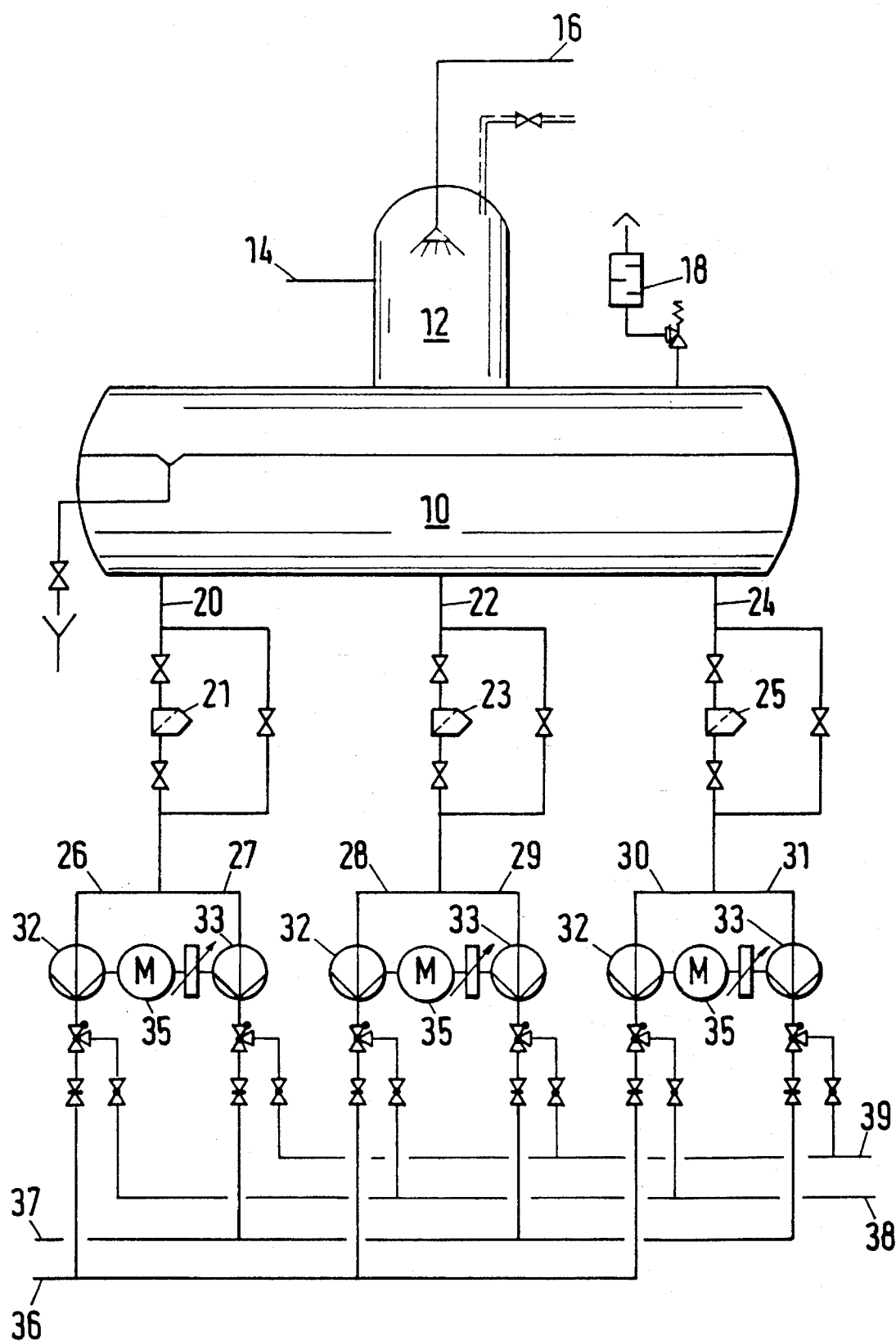

APPARATUS FOR INTRODUCING FEED WATER INTO A COMBINED-CYCLE POWER STATION

BACKGROUND OF THE INVENTION

FIELD OF THE INVENTION

The invention relates to an apparatus for introducing feed water into a steam generator, preferably into a waste-heat boiler of a combined-cycle power station having at least one waste-heat boiler, including a high-pressure system and a low-pressure system to be respectively fed from at least one feed-water container and having feed-water pump lines being respectively configured so as to be triply redundant, the feed-water pump lines having pumps with an electrical drive motor.

In order to provide steam as the driving medium for steam turbines, it is generally known to introduce feed water into a steam generator in which the feed water is evaporated and, if appropriate, superheated. It is then supplied to the relevant steam turbine. In order to introduce the feed water, it is also known to provide pumps which deliver the feed water from a feed-water container or comparable feed-water reservoir.

In a power station block of a combined-cycle installation, as a rule at least two waste-heat boilers which are supplied with feed water in the specified manner are provided. It is then usual to configure the waste-heat boilers as so-called two-pressure waste-heat boilers, i.e. boilers with pipeline systems at different pressure levels. Those pipeline systems are correspondingly continued in the waste-heat boiler by the evaporators and superheaters installed therein.

As in other power station installations, the introduction of the feed water in such a two-pressure waste-heat boiler takes place with triple redundancy for each pressure system, i.e. by employing three mutually independent pumps. Each pump is then usually constructed for 50% of the maximum delivery output so that one pump unit is held in reserve in each case if another unit should fail.

So-called medium-voltage motors are provided as the motorized drives for the high-pressure pumps to suit the different pressure stages, namely high pressure at approximately 120 bar and low pressure at approximately 16 bar, whereas the low-pressure pumps are driven by low-voltage motors which have a relatively unfavorable efficiency as compared with the medium-voltage motors.

SUMMARY OF THE INVENTION

It is accordingly an object of the invention to provide an apparatus for introducing feed water into a combined-cycle power station, which overcomes the hereinafore-mentioned disadvantages of the heretofore-known devices of this general type, which has a simple structure and in which available drive power for pumps can be advantageously utilized.

With the foregoing and other objects in view there is provided, in accordance with the invention, an apparatus for introducing feed water into a steam generator, preferably into a waste-heat boiler of a combined-cycle power station having at least one waste-heat boiler, comprising at least one feed-water container; and a high-pressure system and a low-pressure system to be fed from the at least one feed-water container; the high-pressure and low-pressure systems each having respective feed-water pump lines, pumps connected in the feed-water pump lines, and an electrical drive motor, each of the drive motors driving one of the pumps for the low-pressure system and one of the pumps for the high-pressure system in common. In other words, only half of the previously necessary drive motors are required.

In accordance with another feature of the invention, the drive motors are generally configured as medium-voltage motors. This provides a more favorable power output. This is readily possible and is provided without disadvantage even in the case of the low-pressure pumps.

In accordance with a further feature of the invention, there are provided feed-water pump lines connected to a single feed-water container.

In accordance with an added feature of the invention, each feed-water conduit correspondingly has a filter station connected upstream of the feedwater pump lines, and each of the three feed-water conduits (provided for redundancy reasons) are divided into a high-pressure pump line and a low-pressure pump line following the filter station, as seen in the flow direction.

In accordance with a concomitant feature of the invention, each high-pressure pump line is connected to a high-pressure collecting conduit and each low-pressure pump line is connected to a low-pressure collecting conduit, which are respectively led to the waste-heat boiler.

Other features which are considered as characteristic for the invention are set forth in the appended claims.

Although the invention is illustrated and described herein as embodied in an apparatus for introducing feed water into a combined-cycle power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a diagrammatic and schematic circuit diagram of an embodiment of the invention.

DESCRIPTION OF THE PREFERRED EMBODIMENTS

Referring now to the single FIGURE of the drawing in detail, there is seen a feed-water container 10 with a degasifier 12, a steam preheater 14, a spray connection 16 and a safety valve 18. The feed-water container 10 has three feed-water suction conduit outlets 20, 22 and 24 each being connected to a respective filter station 21, 23 and 25.

Following the filter stations 21, 23 and 25, as seen in the flow direction, each of the feed-water conduits 20, 22 and 24 is respectively divided into a high-pressure pump line 26, 28 and 30 and a low-pressure pump line 27, 29 and 31. Each of the pump lines 26 to 31 is equipped with a pump 32, 33, which is matched to the pressure stage, is respectively connected to a drive motor 35 and is acted upon by the drive motor.

The high-pressure and low-pressure pump lines 26 to 31 have pressure ends which are each connected to a respective collecting conduit 36, 37, that corresponds to the pressure stage and leads to non-illustrated waste-heat boilers. Furthermore, collecting conduits 38, 39, which are likewise related to pressure stages and which are used for compensation of a zero delivery quantity, are connected to the pressure-end pump lines 26 to 31.

The particular advantage of the apparatus shown in the FIGURE is that, apart from the savings in investment expenditure because of the small requirement for drive motors and the associated electrical supply and control, the operating costs are also lower as a result of the employment of more advantageous medium-voltage motors for driving both the low-pressure and the high-pressure pumps.

I claim:

1. An apparatus for introducing feed water into a steam generator, comprising:

at least one feed-water container; and a high-pressure system and a low-pressure system each communicating with said at least one feed-water container for receiving feed-water from said at least one feed-water container;

said high-pressure and low-pressure systems each having respective feed-water pump lines and pumps connected in said feed-water pump lines; and a common electrical drive motor driving one of said pumps for said low-pressure system and one of said pumps for said high-pressure system in common.

2. The apparatus according to claim 1, wherein said common electrical drive motor is a medium-voltage motor.

3. The apparatus according to claim 1, including feed-water conduits fluidically connecting said feed-water container and said feed-water pump lines.

4. The apparatus according to claim 3, including filter stations each being connected in a respective one of said feed-water conduits upstream of said feed-water pump lines, as seen in a flow direction from said feed-water container to said high-pressure and low-pressure systems.

5. The apparatus according to claim 4, wherein a pump line of one of said high-pressure systems and a pump line of one of said low-pressure systems are connected to a respective one of said feed-water conduits downstream of a respective one of said filter stations, as seen in the flow direction.

6. The apparatus according to claim 5, including a low-pressure collecting conduit connected to each of said low-pressure pump lines, and a high-pressure collecting conduit connected to each of said high-pressure pump lines, each of said collecting conduits leading to at least one respective waste-heat boiler.

7. An apparatus for introducing feed water into a waste-heat boiler of a combined-cycle power station having at least one waste-heat boiler, comprising:

at least one feed-water container; and a high-pressure system and a low-pressure system each communicating with said at least one feed-water container for receiving feed-water from said at least one feed-water container;

said high-pressure and low-pressure systems each having respective feed-water pump lines and pumps connected in said feed-water pump lines; and a common electrical drive motor driving one of said pumps for said low-pressure system and one of said pumps for said high-pressure system.

\* \* \* \* \*